(12) United States Patent
Beh

(10) Patent No.: US 11,912,590 B2
(45) Date of Patent: Feb. 27, 2024

(54) OXYGEN-STABLE SOLID ELECTROACTIVE MATERIALS

(71) Applicant: PALO ALTO RESEARCH CENTER INCORPORATED, Palo Alto, CA (US)

(72) Inventor: Eugene S. Beh, Portola Valley, CA (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/704,563

(22) Filed: Mar. 25, 2022

(65) Prior Publication Data

US 2022/0306499 A1 Sep. 29, 2022

Related U.S. Application Data

(60) Provisional application No. 63/166,727, filed on Mar. 26, 2021.

(51) Int. Cl.
| | |
|---|---|
| *C02F 1/461* | (2023.01) |
| *C08J 3/24* | (2006.01) |
| *C08J 7/16* | (2006.01) |
| *C02F 1/66* | (2023.01) |
| *C02F 103/08* | (2006.01) |

(52) U.S. Cl.
CPC ........ *C02F 1/46109* (2013.01); *C02F 1/4618* (2013.01); *C02F 1/66* (2013.01); *C08J 3/24* (2013.01); *C08J 7/16* (2013.01); *C02F 2001/4619* (2013.01); *C02F 2001/46138* (2013.01); *C02F 2103/08* (2013.01)

(58) Field of Classification Search
None
See application file for complete search history.

(56) References Cited

U.S. PATENT DOCUMENTS

| | | | |
|---|---|---|---|
| 11,005,108 B2* | 5/2021 | Surendranath | ...... C07F 15/0033 |
| 2015/0076390 A1* | 3/2015 | Kloeppner | ............... G02B 5/23 |
| | | | 525/326.4 |

(Continued)

FOREIGN PATENT DOCUMENTS

KR 101191480 B1 10/2012

OTHER PUBLICATIONS

Esposito, "Membraneless Electrolyzers for Low-Cost Hydrogen Production in a Renewable Energy Future", Joule 1, Dec. 20, 2017, pp. 651-658.

(Continued)

*Primary Examiner* — Wojciech Haske
(74) *Attorney, Agent, or Firm* — Mueting Raasch Group

(57) ABSTRACT

A redox-active compound is disclosed that is the reaction product of an electron-withdrawing monomer, a cross-linker, and a redox-active moiety. The cross-linker may be connected to the redox-active moiety through the electron-withdrawing functional group. The redox-active compound has a reduced form and an oxidized form and neither the reduced form nor the oxidized form is decomposed by oxygen. The redox-active compound may be used to create a pH gradient in a fluid stream. A redox-active composition may include the redox-active compound, a binder, and a current collector. The redox-active composition may be part of a membraneless electrochemical cell.

7 Claims, 2 Drawing Sheets

(56) References Cited

U.S. PATENT DOCUMENTS

2015/0361206 A1* 12/2015 Shukla ................. C08F 222/02
526/240
2017/0113951 A1    4/2017 Su et al.
2021/0060484 A1    3/2021 Aziz et al.

OTHER PUBLICATIONS

Jin et al., "pH swing cycle for CO2 capture electrochemically driven through proton-coupled electron transfer," Energy Environ. Sci, 2020;13:3706-3722.
Liu et al., "Electrochemically mediated carbon dioxide separation with quinone chemistry in salt-concentrated aqueous media," Nature Communications, 2020; 11:2278: 11 pgs.
Nam et al., "Electrochemical Desalination Using Bi/BiOCI Electrodialysis Cells", ACS Sustainable Chem. Eng., vol. 6, 2018, pp. 15455-15462.
U.S. Appl. No. 17/214,404, filed Mar. 26, 2021, entitled "Electrochemical Device for Creation of PH Gradients.".

* cited by examiner

OXYGEN-STABLE SOLID ELECTROACTIVE MATERIALS

RELATED PATENT DOCUMENTS

This application claims the benefit of U.S. Provisional Application No. 63/166,727, filed on Mar. 26, 2021 which is incorporated herein by reference in its entirety.

TECHNICAL FIELD

This disclosure relates generally to oxygen-stable solid electroactive materials and use of oxygen-stable solid electroactive materials in electrochemical generation of a pH gradient within a fluid stream.

BACKGROUND

The world's oceans absorb carbon dioxide ($CO_2$) from the atmosphere as part of the carbon cycle. As atmospheric carbon dioxide levels have increased, so has the amount of $CO_2$ absorbed by the oceans. When carbon dioxide dissolves in seawater, it reacts to create carbonic acid. The carbonic acid in turn releases hydrogen ions (W), forming carbonate ($CO_3^{-2}$) and bicarbonate ($HCO_3^-$) ions. The pH of seawater, which determines the relative fractions of dissolved carbon dioxide, carbonate, and bicarbonate, is typically around 8.3. This means that the majority of dissolved total carbon in seawater is in the form of bicarbonate. Accumulation of these reactions over time has increased the acidity of the ocean's seawater, negatively affecting oceanic plant and animal life. Removing carbon dioxide from the oceans would provide capacity for the oceans to remove further carbon dioxide from the atmosphere as well as help to restore the pH balance of our oceans' seawater. Moreover, the removed carbon dioxide could be sequestered and/or otherwise used in a variety of industries such as building materials (e.g., concrete), chemicals for commodities (e.g., polymers, potash), fuels (e.g., liquid hydrocarbons), carbon materials (e.g., graphene, nanotubes, etc.), and aquaculture.

One way to achieve carbon dioxide capture from ocean water is by first increasing the water's acidity to release dissolved bicarbonate and carbonate ions as carbon dioxide, and then increasing the alkalinity to restore the pH. Another method to achieve carbon dioxide capture is increasing the pH of ocean water to ~9.3 to precipitate calcium carbonate. Another method for raising the alkalinity of ocean water is to form acid and base streams from ocean water, mix the acidified water with, as an example, a fine suspension of calcium carbonate, which converts the calcium carbonate into calcium bicarbonate, while the basified water is released into the ocean. Raising the alkalinity of the ocean slightly but without precipitating calcium carbonate has been proposed as a method to draw down and store atmospheric carbon dioxide in the ocean as bicarbonate ions. In place of calcium carbonate of various grades, limestone or other carbonate-rich minerals can be added instead. The cation in these reactions does not have to be calcium; minerals rich in magnesium carbonate may also be used. Either method can be accomplished using bipolar membrane electrodialysis, which can produce an acidified and an alkaline stream. However, the production of high concentrations of hydronium ions ("protons") in close proximity to high concentrations of hydroxide ions in the interior of the bipolar membrane creates a minimum energy required for the formation of a pH gradient in the bulk seawater that is inefficient for carbon dioxide extraction.

It would be desirable to provide redox-active materials for use in electrochemical cells can be used to generate a pH gradient in a fluid stream, such as seawater.

DEFINITIONS

Figure 1:
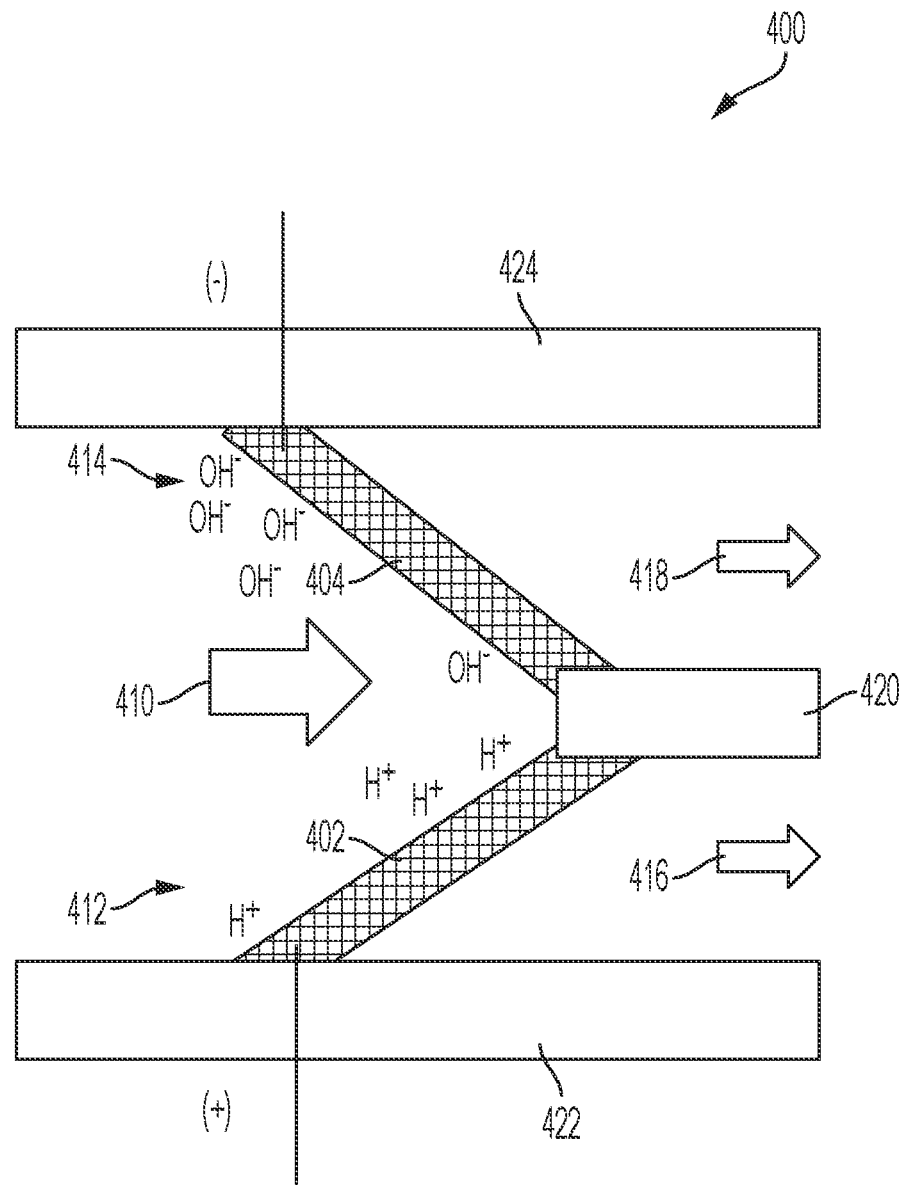
FIG. 1 is a schematic view of a membraneless electrochemical cell including the oxygen-stable redox-active material according to an embodiment

All headings provided herein are for the convenience of the reader and should not be used to limit the meaning of any text that follows the heading, unless so specified.

The term "small molecule" is used here to refer to molecules having a molecular weight below 2000.

The term "oligomer" is used there to refer to molecules containing greater than 1 but fewer than 20 repeating units ("monomers") and having a molecular weight greater than 750.

The term "polymer" is used there to refer to molecules containing greater than 20 repeating units ("monomers").

The term "alkyl" is used here to refer to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

When a group is present more than once in a formula described herein, each group is independently selected, whether specifically stated or not. For example, when more than one Y group is present in a formula, each Y group is independently selected. Furthermore, subgroups contained within these groups are also independently selected. For example, when each Y group contains an $R^1$, each $R^1$ is also independently selected.

The term "substantially" as used here has the same meaning as "nearly completely," and can be understood to modify the term that follows by at least about 90%, at least about 95%, or at least about 98%.

DETAILED DESCRIPTION

Redox-active compounds are disclosed that may be used in electrochemical cells to create a pH gradient. The pH gradient may be formed at low energy, which facilitates efficient extraction of $CO_2$ from ocean water and increases the $CO_2$ absorption capacity of ocean water.

Literature reports (e.g., T. A. Hatton et al., *Nature Communications* 2020, 11, 2278 and M. J. Aziz, D. G. Kwabi et al., *Energy and Environmental Science* 2020, 13, 3706) describe organic compounds that can undergo a proton-coupled redox reaction. In both cases they have increased basicity (absorb $CO_2$ or protons) in their reduced state, and increased acidity (release $CO_2$ or protons) in their oxidized state. This difference in affinity for $CO_2$/protons was exploited in the prior art references to absorb and release $CO_2$, or protons as a proxy for $CO_2$.

The first reference reports an anthraquinone polymer that is the redox-active material in a solid electrode system, but it is oxygen-sensitive. The second reference reports a phenazine small molecule (not a polymer) that is used in the solution phase and is also oxygen-sensitive. In both cases, oxygen reacts with the reduced form of the redox materials and re-oxidizes them to their oxidized state. For a practical $CO_2$ capture application, whether from flue gas, air, seawater, or some other source, it is highly desirable for the capture agent to be stable to oxygen. Embodiments described herein are directed to classes of solid-phase redox active materials that are capable of proton-coupled redox reactions and are also stable to oxygen and to systems that use these materials to create pH gradients in water or other aqueous solutions.

Example systems that use redox-active materials to create a pH gradient are described in co-pending U.S. patent application Ser. No. 17/214,404 entitled Electrochemical Cell for Creation of pH Gradients, filed on Mar. 26, 2021, which is hereby incorporated by reference in its entirety. Certain of these membraneless electrochemical cells use a Bi/BiOCl proton-coupled redox couple to create pH gradients in bulk liquid and formed at low energy. These pH gradients facilitate efficient extraction of $CO_2$ from ocean water, which thereby increases the $CO_2$ absorption capacity of ocean water.

The redox-active compounds and materials described herein include a redox-active moiety, such as a quinone or phenazine derivative, capable of undergoing proton-coupled redox reactions. According to an embodiment, by attaching suitable electron-withdrawing groups to the redox-active moiety, the derivatives have at least two oxidation states that are stable to oxygen and are capable of absorbing or releasing protons to the surrounding electrolyte solution when reduced or oxidized, respectively. The redox-active compound may undergo a proton-coupled redox reaction at a predetermined pH. The redox-active materials may be provided as a small molecule or a polymeric material.

According to an embodiment, the redox-active compounds and materials include a redox-active moiety $R^1$. The redox-active moiety $R^1$ may be connected to other chemical functionalities, such as an electron-withdrawing group, a linker, or both. The redox-active moiety $R^1$ may be connected to an electron-withdrawing group that in turn is connected to a linker. In certain embodiments, the chemical functionalities connected to the redox-active moiety, such as the electron withdrawing group or linker, include chemical functionalities that can be used for further reactions, including polymerizations or grafting.

According to a preferred embodiment, the redox-active compound or material is an oligomer or polymer that includes a plurality of the redox-active moieties $R^1$. The redox-active moieties may be pendant groups, may be part of the polymer backbone, or may participate in cross-linking of the oligomer or polymer. The plurality of redox-active moieties $R^1$ of the oligomer or polymer may all be the same or may include different redox-active moieties. The redox-active compound or material may include redox-active moieties as both pendant groups and as cross-linked groups. A redox-active oligomer or polymer may have the following general structure IA, including redox-active moieties $R^1$ as pendant groups:

(IA)

A redox-active oligomer or polymer that is cross-linked and includes redox-active moieties as both pendant groups and as cross-linkers may have the following general structure (IB):

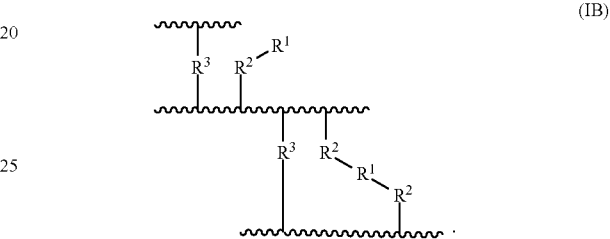

(IB)

The structures and cross-linkages are shown schematically and are not necessarily representative of the actual structure or scale of the oligomer or polymer or the number of monomers or cross-linkages forming the oligomer or polymer. In Formula IB, the redox-active moiety is shown as $R^1$. $R^1$ may be linked to an electron-withdrawing monomer $R^2$. The oligomer or polymer may further include a cross-linker $R^3$.

The redox-active moiety $R^1$ and the electron-withdrawing monomer $R^2$ may also be present in the backbone of the oligomer or polymer, as shown in the following general structure (IC):

(IC)

The redox-active moiety $R^1$ and the electron-withdrawing monomer $R^2$ may also form pendant groups attached to a surface (such as graphene flake or a metal surface like gold or copper), as shown in the following general structure (ID):

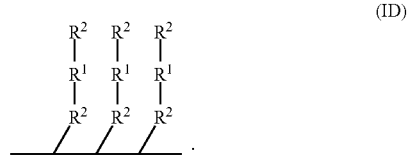

(ID)

Examples of suitable redox-active moieties include quinones, phenazines, and derivatives thereof. Examples of quinones include 1,2-benzoquinone, 1,4-benzoquinone, 1,4-naphthoquinone, and 9,10-anthraquinone, the structures of which are shown below.

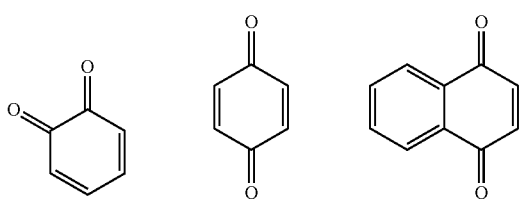

1,2-benzoquinone    1,4-benzoquinone    1,4-naphthoquinone

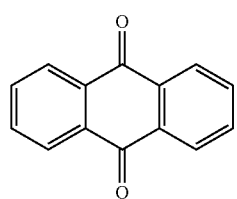

9,10-anthraquinone

The structures of phenazine and chloranil, a derivative of 1,4-benzoquinone, are shown below.

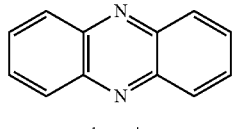 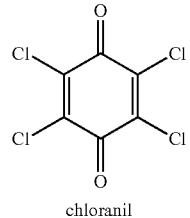

phenazine    chloranil

In certain preferred embodiments, the redox-active moiety is chloranil or a reaction product of chloranil.

Examples of functionalities connected (either directly or indirectly) to the redox-active moiety include vinyl groups, methacrylates, acrylates, styrenic groups, imides, amines, anhydrides, alcohols, phenols, and carbonates. In some embodiments, a functional group may be used to covalently attach the redox-active moiety to a linker. The functional group may be or may include an electron-withdrawing group (e.g., electron-withdrawing monomer $R^2$). Without wishing to be bound by theory, the functional group is thought to also serve a controlling function on the redox-active moiety.

Examples of functional groups capable of acting as an electron-withdrawing group (e.g., electron-withdrawing monomer $R^2$) include ketones (—C(O)—), esters (—OC(O)—), carboxyl (—C(O)O—), amide (—NHC(O)— or —C(O)NH—), sulfoxide (—S(O)—), sulfone (—SO$_2$—), sulfonate (—SO$_3$— or —OSO$_2$—), sulfate (—OSO$_3$—), azo (—N=N—), phosphonate ester (—OP(O)O—), difluoromethylene (—CF$_2$—), imidazolium, pyridinium, and pyrazinium. In some embodiments, the functional group is selected from imidazolium, pyridinium, and pyrazinium. The structures of imidazolium, pyridinium, and pyrazinium are shown below.

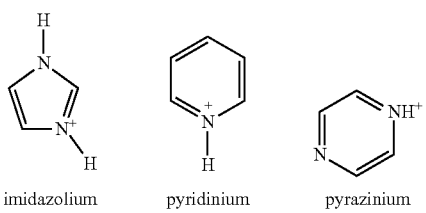

imidazolium    pyridinium    pyrazinium

The functional group may further include a structure or group to facilitate covalently bonding the redox-active moiety to the linker. An example of a suitable structure is a vinyl group or another ethylenically unsaturated group.

Exemplary structures of a redox-active moiety coupled with imidazolium (Structure IIA), pyridinium (Structure IIB), and pyrazinium (Structure IIC) functional groups are shown below.

Structure IIA

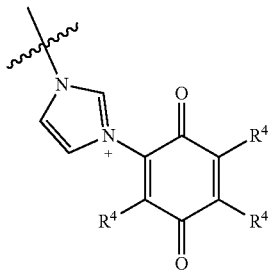

Structure IIB

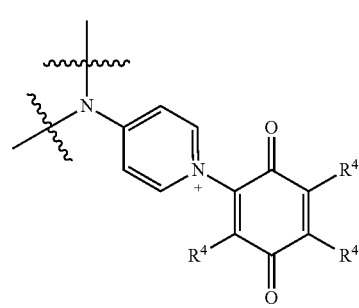

Structure IIC

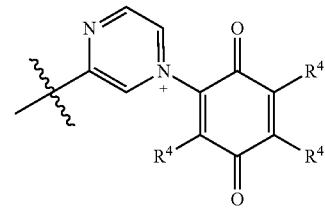

The illustrated structures include para-benzoquinone as the redox-active moiety, but a similar principle would also apply to the other redox-active moieties described above.

The redox-active moiety may be substituted with $R^4$. Each $R^4$ may be independently hydrogen, halogen (e.g., chlorine, fluorine, bromine, iodine), hydroxyl, carbonyl, alkyl (e.g., methyl, ethyl, propyl, butyl, etc.), branched alkyl, alkoxy or phenoxy, thioether or thiophenol, thiol (—SH), amino (—NH$_2$), nitrile (—CN), nitro (—NO$_2$), aldehyde (—C(O)H), carboxylic acid (—CO$_2$H), azide (—N$_3$), phosphonic acid (—PO$_3$H$_2$), ketone (—C(O)—), esters (—OC(O)—), carboxyl (—C(O)O—), amide (—NHC(O)— or —C(O)NH—), sulfoxide (—S(O)—), sulfone (—SO$_2$—), sulfonate (—SO₃— or —OSO₂—), sulfate (—OSO₃—), azo (—N=N—), phosphonate ester (—OP(O)O—), difluoromethylene (—CF₂—), imidazolium, pyridinium, and pyrazinium, or their oxidized or reduced forms. Unlike the electron-withdrawing monomer $R^2$, these additional functional groups can be electron-withdrawing or electron-donating. In preferred embodiments, these groups will uptake or release a proton on oxidation or reduction of the redox-active moiety.

The functional group may be used to connect the redox-active moiety to a linker. The linker, alone or together with the functional group, may form the backbone of the oligomer or polymer. In some embodiments, these groups can be used to form a polymer backbone decorated with the redox-active moiety. In some embodiments, these groups can be used to form a polymer backbone containing the redox-active moiety. The linker may be a monomer that participates in forming the backbone of the oligomer or polymer, and may also act as a cross-linker.

In some embodiments, the redox-active material is free of any functional groups (other than hydrogen, hydroxyl, or halogen) that do not link to a linker. According to an embodiment, all substitutions other than hydrogen, hydroxyl, or halogen on the redox-active moiety link the redox-active moiety to a linker. In one embodiment, all substitutions on the redox-active moiety either participate in proton-coupled redox reactions or link the redox-active moiety to a linker.

Suitable linkers include monomers that are capable of forming an oligomer or polymer backbone and linking to the electron-withdrawing functional group. According to an embodiment, the linkers may also be capable of acting as cross-linkers. The linker may be a monomer, or may itself be an oligomer or polymer. Examples of suitable linkers include straight chain alkyl, branched alkyl, poly(ethylene glycol), poly(vinyl alcohol), cellulose, and practically any other organic polymer, other organic compounds, and polymers thereof. In embodiments where the linker is an oligomer or polymer, the linker may be long or short, incorporate few or many repeating subunits, can be a homopolymer, a copolymer, or a block polymer. Each linker may be bonded to one or more functional groups as described above that couple the linker with one or more redox-active moieties. The linker may be cross-linked with itself or with other linkers.

According to an embodiment, the redox-active compound includes the electron-withdrawing monomer and the linker at a weight ratio of 1 to 10 parts of electron-withdrawing monomer to every 1 part of linker. The redox-active compound may include the redox-active moiety and the electron-withdrawing monomer at a molar ratio of 1 unit redox-active moiety to every 1 to 2 units of electron-withdrawing monomer.

Exemplary synthetic pathways of oxygen-stable redox active materials are shown in the schematics below. Chloranil (2,3,5,6-tetrachloro-1,4-benzoquinone) is dissolved in dichloromethane and a solution in dichloromethane of a linker with two or more functional groups attached is added in an appropriate stoichiometry, in this case 1 molar equivalent. The reaction mixture rapidly forms a dark red precipitate that is filtered off, washed with dichloromethane, and dried. The precipitate may be hydrolyzed by stirring in water to form the target redox-active materials. The materials may be isolated by filtration, washed with more water, and dried.

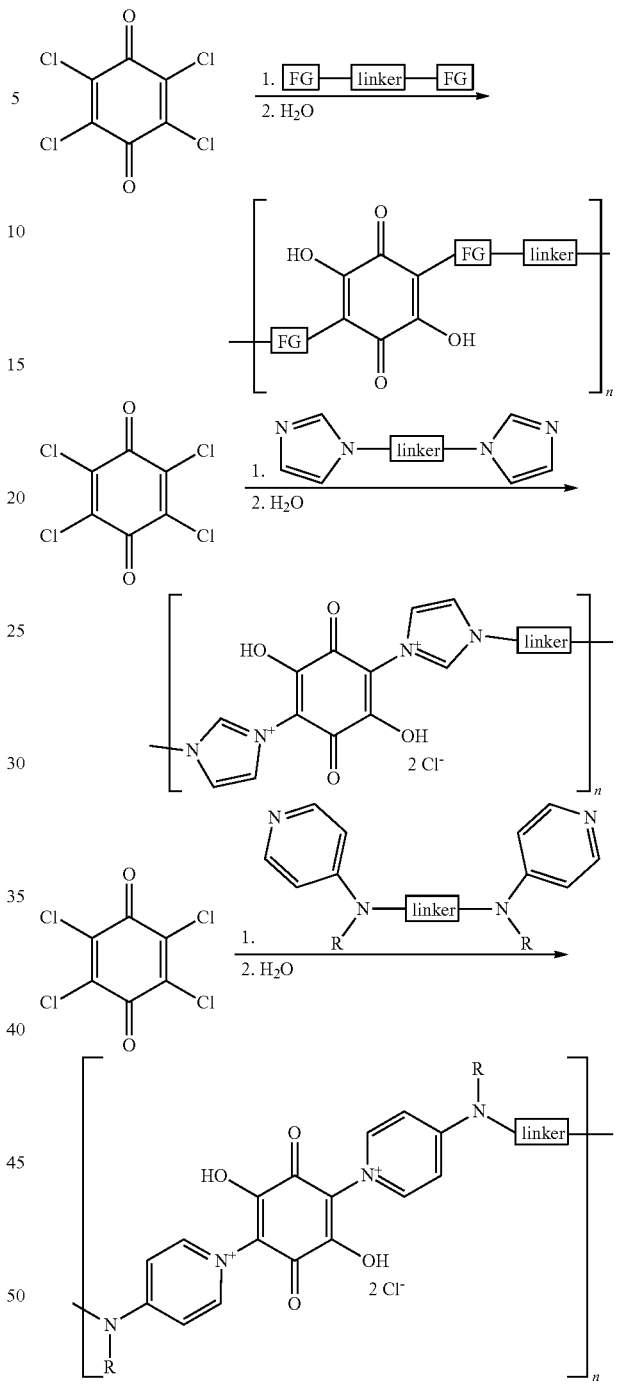

According to an embodiment, the redox-active material may be chemically or physically grafted onto a surface. This can be accomplished by adding a chemical functionality to the redox-active moiety, the electron-withdrawing group, or the linker, that can then be reacted with a surface. Alternatively, the electrical functionality can be attached through an oligomer or polymer. The grafting can optionally be done between the redox-active material and a conductive surface to ensure electrical contact with the electroactive material. Functional groups capable of such a grafting include vinyl groups, thiols, azides, alkynes, 1-2 dienes, amines, acid chlorides, anhydrides, carboxylic acids, and the like.

In one embodiment, the redox-active material includes grafting groups bonded to the redox-active moiety, the electron-withdrawing group, the linker, or a combination thereof, where the grafting groups are selected from vinyl groups, thiols, azides, alkynes, 1-2 dienes, amines, acid chlorides, anhydrides, and carboxylic acids.

The redox-active materials of the present disclosure may be employed on solid electrodes in a pH swing electrolyzer. As described in the co-pending U.S. patent application Ser. No. 17/214,404, filed on Mar. 26, 2021, and entitled Electrochemical Cell for Creation of pH Gradients, electrodes including a suitable redox-active material may be used to create small pH gradients at low energy consumption. This effect may be exploited in several applications including oceanic capture of carbon dioxide, either through extracting $CO_2$ from acidified seawater, or by facilitating the dissolution of limestone into acidified seawater. In either case, an alkaline stream of seawater with elevated pH is created. This stream may be used in another part of the system to react with $CO_2$ from the atmosphere or other point source, or the stream may be released directly into the ocean where it will eventually absorb the same quantity of $CO_2$ from the atmosphere.

In order for such a system to be practical, it is beneficial for the redox-active moiety to be (a) proton-coupled so that it can create a pH change when reduced or oxidized, (b) composed of earth-abundant elements, and (c) stable to oxygen in the air. According to an embodiment, the redox-active compounds of the present disclosure are (a) proton-coupled, (b) composed of earth-abundant elements, and (c) stable to oxygen in the air. The oxygen stability of the redox-active materials is closely correlated to their reduction potential in aqueous solution. While the oxidized forms of the molecules are generally stable, in general, the lower the reduction potential, the more rapidly the reduced form of the molecule is oxidized by oxygen. For example, anthraquinone has a lower reduction potential than naphthoquinone, which in turn is lower than benzoquinone. The reduced form of anthraquinone (9,10-dihydroxyanthracene) is rapidly oxidized in air, the reduced form of naphthoquinone (1,4-dihydroxynaphthalene) less so, and the reduced form of benzoquinone (1,4-hydroquinone) is reasonably stable in air.

According to an embodiment, the redox-active material of the present disclosure may be coated onto electrodes with an optional binder according to standard procedures for making solid electrode aqueous batteries (see, e.g., J. Chen et al., *Science Advances* 2018, 4, eaao1761). The binder may be a conductive binder such as polyvinylidene fluoride.

In an embodiment, an electrode with a redox-active coating is provided, where the redox-active coating includes the redox-active material of the present disclosure. The coating may further include a binder mixed with the redox-active material. The coating may include a conductive binder. The redox-active material may include an oligomer or polymer as described above. According to an embodiment, a redox-active composition includes the redox-active compound, a binder, and a current collector such as carbon black.

The redox-active composition may be included in a membraneless electrochemical cell as illustrated in FIG. 1. Such a membraneless electrochemical cell 400 may include a first electrode 402 and a second electrode 404, a fluid stream input 410 to the membraneless electrochemical cell 400, and a first effluent stream 416 with a first pH and a second effluent stream 418 with a second pH different from the first pH. The first electrode 402 may include a first current collector and a first redox-active material configured to have a proton-coupled oxidation reaction with a first portion 412 of the fluid stream input 410 to form a pH-modified first portion. The second electrode 404 may include a second current collector and a second redox-active material configured to have a proton-coupled reduction reaction with a second portion 414 of the fluid stream input 410 to form a pH-modified second portion. The first redox-active material may include a first electron-withdrawing monomer; a first cross-linker; and a first redox-active moiety, and the second redox-active material may include a second electron-withdrawing monomer; a second cross-linker; and a second redox-active moiety. In the embodiment shown, the electrodes 402, 404 are positioned at an angle converging toward each other. The first electrode 402 extends from a first wall 422 of the cell 400 toward an interior impermeable wall 420, while the second electrode 404 extends from a second wall 424 of the cell 400 toward wall 420. Alternatively, the electrodes 402, 404 may be positioned in opposition to one another, or in any other suitable configuration. There is no non-porous membrane or physical barrier at the input of the feed stream. However, the walls 422, 424 of the flow-through cell 400 may also include flow channels proximate the input and/or electrodes 402, 404 and/or an intervening porous separator to assist in directing the flow through the cell 400. After a first portion 412 of the feed stream 410 passes through the first electrode 402 it is separated from the second portion 414 that passes through the second electrode 404 by wall 420. The effluent streams 416, 418 may then be stored, processed, and/or discharged.

When an electrical potential is applied to the first and second electrodes 402, 404, hydroxide ions are absorbed or hydronium ions are produced proximate the electrode where a proton-coupled oxidation reaction is taking place, and hydronium ions are absorbed or hydroxide ions are produced proximate the electrode where a proton-coupled reduction reaction is taking place.

The first and second redox-active material may be either different from one another or have the same chemical composition. Either one or both of the first and second redox-active materials may be grafted onto the first or second electrodes, respectively.

According to an embodiment, a method of creating a pH difference includes flowing an aqueous electrolyte feed stream into the fluid stream input of the membraneless electrochemical cell, directing a first portion of the feed stream to contact the first electrode, directing a second portion of the feed stream to contact the second electrode, and applying an electrical potential to the first and second electrodes. In response to applying the electrical potential, the redox-active material on the first electrode is oxidized in contact with the first portion of the feed stream, forming the pH-modified first portion, and the redox-active material on the second electrode is reduced in contact with the second portion of the feed stream, forming the pH-modified second portion. The pH-modified first portion may be removed from the electrochemical cell as the first effluent stream, and the pH-modified second portion may be removed from the electrochemical cell as the second effluent stream. The method may further include reacting the first effluent stream with a carbonate-rich mineral to release a target molecule or solute from the first effluent stream.

Figure 2:
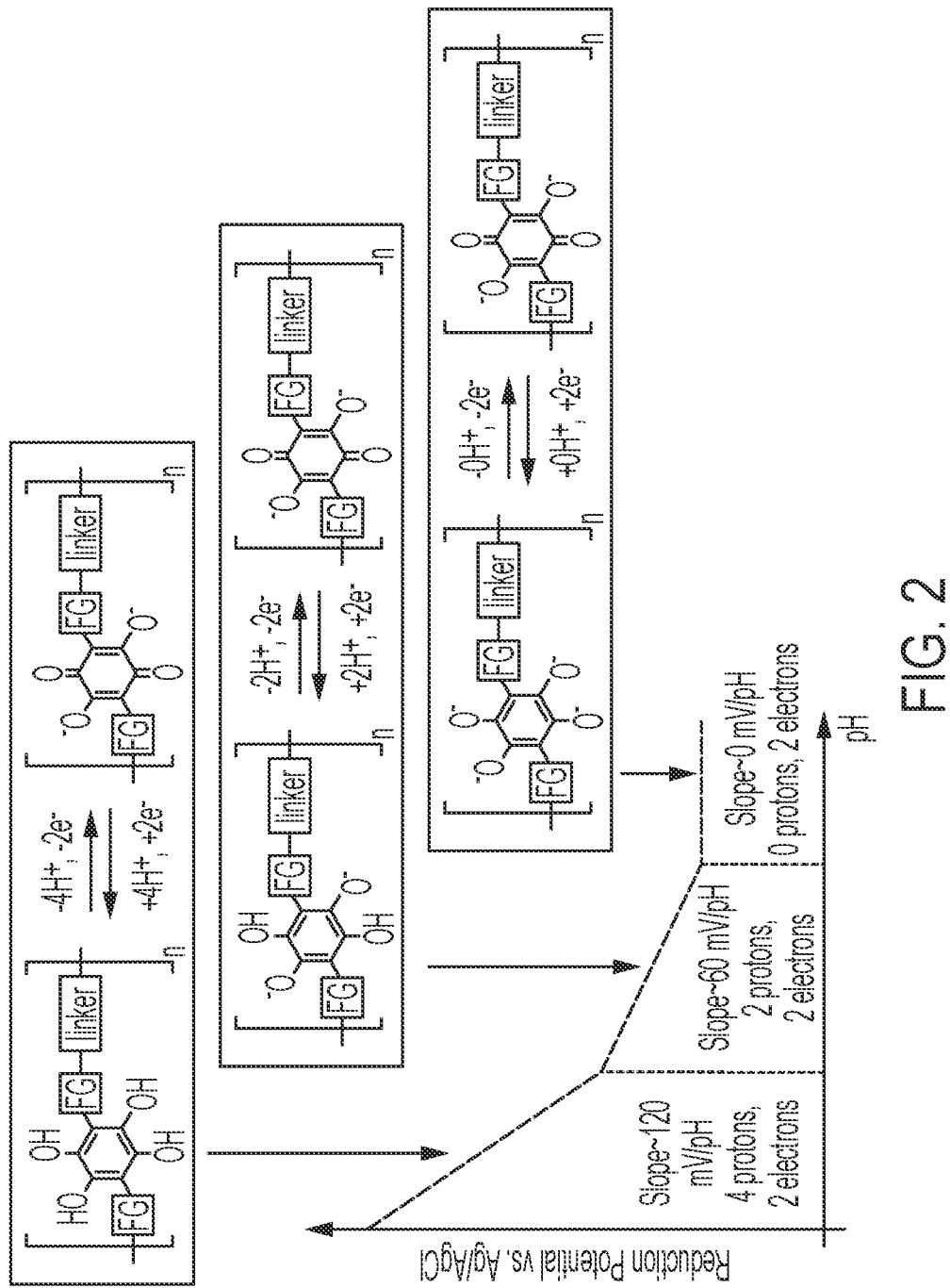
FIG. 2 is a Pourbaix diagram of an oxygen-stable redox-active material according to an embodiment.

The suitability of a material as a redox-active material in creating pH gradients can be assessed by measuring the reduction potential on a small amount (e.g., 1 mg of material) of the active material in a conventional 3-electrode cell, using a large number of different pH buffers. From this data, a Pourbaix diagram can be constructed. The suitability of the material as a redox-active material at the desired pH may be evaluated from the slope on the Pourbaix diagram, as shown in FIG. 2. FIG. 2 illustrates a Pourbaix diagram of an oxygen-stable redox-active material for ocean capture of $CO_2$, in accordance with various embodiments described herein. The active material can only form pH gradients in a pH range with nonzero slope (i.e. the reaction is no longer proton coupled if the slope is zero).

The complete disclosures of the patents, patent documents, and publications identified herein are incorporated by reference in their entirety as if each were individually incorporated. To the extent there is a conflict or discrepancy between this document and the disclosure in any such incorporated document, this document will control.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. A redox-active compound comprising a reaction product of:
    a monomer which upon reacting provides an imidazolium, pyridinium, or pyrazolium as an electron-withdrawing group;
    a cross-linker comprising divinylbenzene or polydivinylbenzene; and
    a redox-active moiety comprising a quinone, a phenazine, a pyrazine, a quinoxaline, or a derivative thereof.

2. The redox-active compound of claim 1, wherein the cross-linker is connected to the redox-active moiety through an electron-withdrawing group.

3. The redox-active compound of claim 1, wherein the electron-withdrawing monomer comprises imidazolium.

4. The redox-active compound of claim 1, wherein the redox-active compound has a reduced form and an oxidized form and neither the reduced form nor the oxidized form reacts with oxygen.

5. The redox-active compound of claim 1, wherein the redox-active moiety comprises chloranil or a reaction product of chloranil.

6. The redox-active compound of claim 1, wherein the redox-active compound is a polymer that comprises the electron-withdrawing group and the cross-linker at a weight ratio of 1 to 10 parts of electron-withdrawing group to every 1 part of cross-linker.

7. A redox-active composition comprising:
    the redox-active compound of claim 1;
    a binder; and
    a current collector.

* * * * *